United States Patent [19]

Rider

[11] Patent Number: 4,627,745

[45] Date of Patent: Dec. 9, 1986

[54] FAST RESPONDING TEMPERATURE TRANSDUCER CIRCUIT

[75] Inventor: Billie F. Rider, Cedar Rapids, Iowa

[73] Assignee: Rockwell International Corporation, El Segundo, Calif.

[21] Appl. No.: 553,739

[22] Filed: Nov. 21, 1983

[51] Int. Cl.[4] .................... G01K 7/00; G01K 7/16
[52] U.S. Cl. .................... 374/183; 374/168; 374/172; 374/163
[58] Field of Search ............... 374/110, 168, 169, 172, 374/173, 181, 163, 175, 178, 183; 307/117

[56] References Cited

U.S. PATENT DOCUMENTS

| | | | |
|---|---|---|---|
| 3,759,083 | 9/1973 | Erickson et al. | 374/168 |
| 3,890,841 | 6/1975 | Brixy | 374/175 |
| 3,906,797 | 9/1975 | Turner | 374/168 |
| 4,099,413 | 7/1978 | Ohte et al. | 374/175 |
| 4,201,088 | 5/1980 | Trietley, Jr. | 374/172 |
| 4,359,285 | 11/1982 | Washburn | 374/172 |
| 4,399,824 | 8/1983 | Davidson | 374/163 |
| 4,478,527 | 10/1984 | Mergner | 374/172 |

FOREIGN PATENT DOCUMENTS 125883 2/1978 Japan ...................... 374/169

Primary Examiner—Charles Frankfort
Assistant Examiner—Thomas B. Will
Attorney, Agent, or Firm—George A. Montanye; H. Fredrick Hamann

[57] ABSTRACT

There is disclosed a fast responding temperature transducer circuit which provides an accurate steady-state output representing temperature in short periods of time. The circuit includes a temperature sensor which is sampled during alternate periods of time so that during one period, the temperature sensor provides a signal representing temperature, and during the alternate periods, the sensor output is shorted to prevent heat dissipation within the temperature sensor. The system may be used to achieve steady-state outputs in environments requiring fast response without a loss of accuracy and operable over wide temperature ranges.

15 Claims, 2 Drawing Figures

FAST RESPONDING TEMPERATURE TRANSDUCER CIRCUIT

The Government has rights in this invention pursuant to contract number DAAH01-82-C-A309, awarded by the United States Army.

BACKGROUND OF THE INVENTION

The present invention relates to temperature measurement systems and, more particularly, to techniques for reducing transient error in temperature sensors to improve response time.

In the prior art there are known a variety of temperature sensing systems which use a temperature sensing element to provide an outlet voltage which is a representation of the temperature of the environment in which the sensor is located. Such devices may be constructed from conventional integrated circuits and typically are highly accurate and linear over wide temperature ranges. The devices, however, when coupled to provide the temperature indicating voltage output, internally dissipate heat resulting in a transient error for a period of several minutes. This transient error prevents the sensor from attaining a steady-state output within certain tolerances until the expiration of that time. Such lengthy times limit the applications in which the sensors may be utilized.

By way of illustration, temperature sensors are used in many systems in which the reaction time must be very short, sometimes on the order of seconds. In many guidance systems, for example, the reaction time of the system must be sufficient to operate and guide a vehicle or projectile on short notice and for short periods of time. In inertial guidance systems in particular, there is a requirement that the internal temperature of the guidance system be monitored in order to allow calculation of compensation signals for modification of scale factors used in the guidance system. If the guidance system is to only be operable for several seconds, or less than a couple of minutes, the transient error introduced by heat dissipation in conventional temperature sensors prevents accurate temperature signal outputs during guidance system operation.

As a result of the above, guidance systems which employ such temperature sensors cannot be used in situations where the temperature measurements must be made within certain tolerances and within time periods less than those required to achieve a steady-state output. Alternatively, complex and costly circuits must be used to predict the transient error caused by the internal temperature rise in the sensor so that an accurate representation of the temperature is provided for use by the guidance system. In either case, there is no simplified and inexpensive technique available to obtain accurate temperature sensing with fast response times, low cost, and easy implementation with control circuits.

Accordingly, the present invention has been developed to overcome the specific shortcomings of the above known and similar techniques, and to provide an improved temperature sensing system with improved response time and operable over wide temperature ranges.

SUMMARY OF THE INVENTION

In accordance with the present invention, a temperature sensor of conventional construction is coupled and powered to provide a voltage output indicative of the temperature of the environment in which the sensor is located. That output is then coupled to a switching network which is controlled by a clock source to alternately sample and short the analog voltage output representing the temperature. During the periods of sampling, the analog voltage output is sampled and stored and used as the voltage representative of the temperature of the environment in which the sensor is located. During the alternate non-sampling intervals, the analog voltage is shorted to prevent heat dissipation in the temperature sensor and thereby restrict the effect of transient error caused by an internal temperature rise.

It is therefore a feature of the invention to provide an improved temperature sensing system which reduces the response time for providing accurate temperature readings.

Another feature of the invention is to provide a temperature sensing system which reduces transient error over wide temperature ranges to provide faster and more accurate temperature signals.

Still another feature of the invention is to provide a temperature sensing circuit constructed from integrated circuits having a voltage output which is alternately sampled and shorted to provide a signal representing temperature.

Yet another feature of the invention is to provide a temperature sensing circuit driven by a clock pulse source which produces steady-state temperature readings within certain tolerances in a matter of seconds.

Yet still another feature of the invention is to provide a temperature sensing circuit which minimizes internal temperature rise caused by heat dissipation in the temperature sensor during temperature readout.

These and other advantages and novel features of the invention will become apparent from the following detailed description when considered with the accompanying drawings wherein:

DETAILED DESCRIPTION OF PREFERRED EMBODIMENTS

Figure 1:
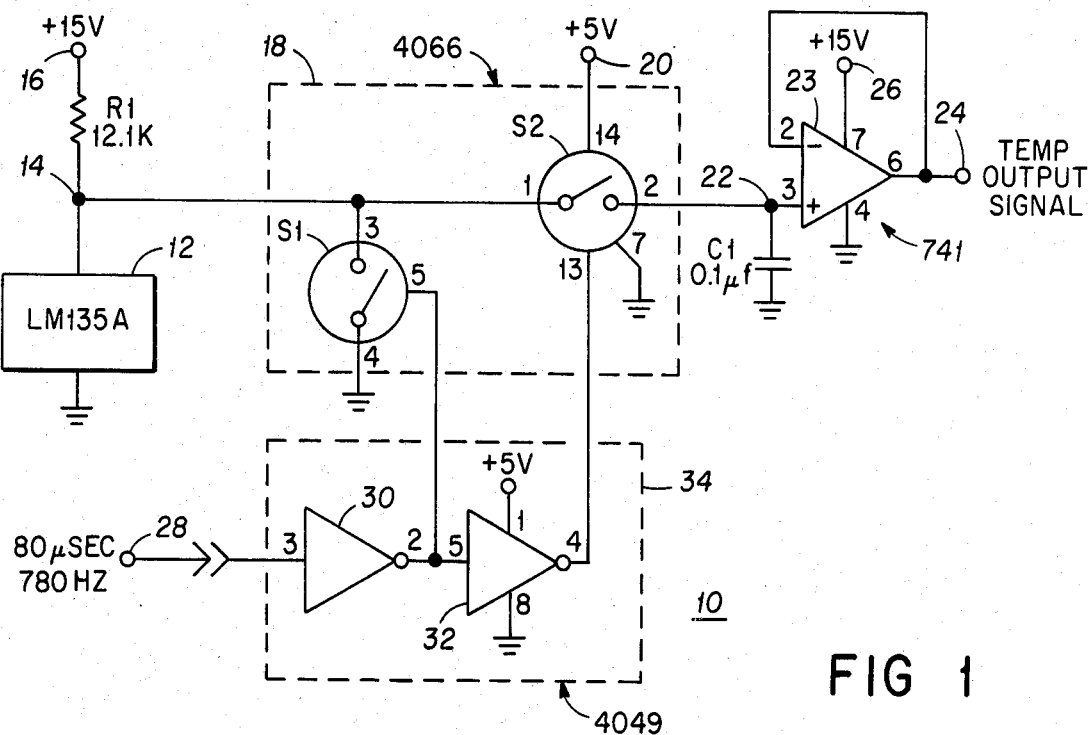
FIG. 1 is a schematic diagram showing one embodiment of a temperature sensor system having an alternately pulsed read-out of the temperature for fast response in accordance with the present invention.

Referring now to FIG. 1 wherein like numerals are used to refer to like elements throughout, there is shown a temperature sensing system 10 constructed in accordance with the present invention. The system 10 includes a conventional temperature sensor 12 having one output terminal coupled to ground and another coupled to terminal 14. Terminal 14 is likewise coupled through resistor R1 to terminal 16 where it is supplied with a regulated voltage, such as that 15 volts shown in the drawing. Typically, the temperature sensor 12 may be a well-known integrated circuit, such as a National Semiconductor LM135A, which has the characteristics of providing a highly accurate and linear voltage output over wide temperature ranges, for example, −55° C. to +75° C.

The above-referenced sensor 12, and other integrated circuits of similar construction, operate such that the voltage provided at the terminal 16 through resistor R1 causes a voltage at terminal 14 which varies as function of absolute temperature, typically a value of +10 mV/°

K. Accordingly, if the voltage at terminal 16 is highly regulated, the output voltage at terminal 14 will accurately reflect the temperature change of the environment in which the sensor 12 is located. However, when the voltage at terminal 16 is applied to the sensor 12, there is a dissipation of heat by the sensor 12 due to the current flow internal of the sensor 12. It will therefore be appreciated that such heat dissipation causes an internal temperature rise in the sensor 12 which in turn causes a transient error in the analog voltage output representing temperature at terminal 14.

In experimental tests of conventional sensors 12 having a heat dissipation in the range of 0.003 watts, it has been determined that the internal temperature rise causes a transient error which lasts for about 165 seconds. That is, the time required for the output at terminal 14 to reach a steady-state value within 0.1° C., is approximately 165 seconds. It will thus be seen that the analog voltage output at terminal 14 will not produce an accurate reading reflecting the temperature of the environment until the expiration of that time period. This allows unacceptable voltage readings to remain for a significant period of time.

As was noted above, in application whereits operation is not required immediately or such time periods are acceptable before achieving a steady-state output, the conventional integrated circuits forming sensors 12 have been widely used and provide high accuracy and linearity over the wide temperature ranges. However, in applications which require temperature measurements within certain tolerances in less than the 165 second time period (e.g., less than 10 seconds), such conventional sensors 12 cannot be used to provide accurate readings without compensation of the voltage at terminal 14. In guidance systems, in particular, short reaction times are sometimes critical for the reasons noted previously, and accordingly, the sensors 12 do not provide sufficient accuracy for operation of the guidance system during that short period of time. As a result, expensive and complex techniques must be employed to compensate for the errors introduced when such sensors 12 are used, or the problems encountered by inaccurate temperature sensing must be compensated in some other manner.

In accordance with the present invention, a system and technique is disclosed which enables the use of such conventional sensors 12 with only minor modifications using relatively inexpensive structures that may be implemented in a simplified manner. Referring again to the FIG. 1, wherein the interrelationship of the elements is shown, the output terminal 14 is coupled to a switching device 18 which may be a conventional analog switch such as an RCA 4066 or similar structure. The switch 18 includes two switches S1 and S2 which are coupled as shown. In this instance, switch S1 has its input pin 3 coupled to terminal 14 and its output pin 4 coupled to ground. Pin 5 of switch S1 is coupled to receive a control voltage from a clock pulse source as will be described in greater detail below. However, pins 3 and 4 of S1 are coupled by a switch contact which is controlled by a voltage on pin 5 of S1 to move the contact between an electrically open and electrically closed position. This operation of S1 forms, in the open position, an electrically open path between terminal 14 and ground and, in the closed position, a shorted path between terminal 14 and ground.

In a similar manner, switch S2 has an input pin 1 coupled to terminal 14 and an output pin 2 forming the output of switch S2. Switch S2 additionally has a pin 14 coupled to terminal 20 which receives a driving voltage (e.g., 5 volts), and a pin 7 which is coupled to ground. Switch S2 also has a pin 13 coupled to receive a control voltage from the clock source for moving a switch contact (between pins 1 and 2) between an electrically open and electrically closed position in a manner similar to switch S1. As will be appreciated, when switch S2 is closed, the output of terminal 14 is coupled to the output pin 2 of switch S2 through the switch contact and pin 1, and that path is broken when switch S2 is opened.

The output from pin 2 of switch S2 is coupled to terminal 22 forming one terminal of capacitor C1. Capacitor C1 in turn has its second terminal coupled to ground. Terminal 22 is also coupled as input to the positive terminal formed by pin 3 of a conventional 741 operational amplifier 23. Operational amplifier 23 has an output terminal formed by pin 6 which is coupled to provide the system temperature output signal at terminal 24. Pin 6 of amplifier 23 is also coupled as input to the negative terminal of operational amplifier 23 at pin 2. Pin 7 of operational amplifier 23 is coupled to terminal 26 which has a driving voltage applied thereto (e.g., 15 volts), while pin 4 is coupled to ground. In this configuration, the system temperature output signal at terminal 24 is an analog voltage which represents the temperature of the environment in which the temperature sensor 12 is located.

The switches S1 and S2 of switching circuit 18 are driven by a pulse clock source which is coupled to terminal 28 to provide operation of the switches S1 and S2 in accordance with the invention. The pulse clock source may be, for example, any conventional device capable of providing an output of pulses spaced by a selected amount at a predetermined repetition frequency. In the present instance, the pulse clock source coupled to terminal 28 may be one which provides an 80 μS pulse spaced by about 1200-1300 μS and thus having a repetition frequency of about 780 Hz.

The clock pulse output at terminal 28 is coupled to a driving circuit 34 which may typically be a 4049 integrated circuit manufactured by a variety of companies. Circuit 34 includes inverting amplifiers 30 and 32. Pin 3 of inverting amplifier 30 is coupled to terminal 28 while the inverted output at pin 2 of inverting amplifier 30 is coupled to pin 5 of switch S1 as well as to pin 5 of the second inverting amplifier 32. The output pin 4 of inverting amplifier 32 provides its inverted output to pin 13 of switch S2. Pin 1 of inverting amplifier 32 is coupled to a source of power (e.g., 5 volts), while pin 8 is coupled to ground. As will be understood, the function of the circuit 34 is to produce an inversion of the clock pulse source 28 to drive the switches S1 and S2 in the manner as will be detailed below.

As will be understood by reference to the above description, the operation of the system is such as to produce an alternate sampling and shorting of the voltage at terminal 14 through switches S1 and S2 under the control of the clock source at terminal 28. In accordance with the circuit shown in FIG. 1, the switches S1 and S2 are turned on (electrically conductive path between pins 3-4 and 1-2 of switches S1 and S2, respectively) when their respective control pins (5 and 13) receive a high level voltage control signal from the pulse clock source at 28. Likewise, the switches S1 and S2 are turned off (electrically open path between pins 3-4 and 1-2 of switches S1 and S2, respectively) when the control pins 5 and 13, receive a low level voltage control signal from the clock source at 28.

Accordingly, during application of the 80 μS pulses (high level voltage control signal) at terminal 28, the control voltage delivered to pin 5 of S1 is low due to the inversion of the clock pulse at terminal 28 by inverting amplifier 30. At the same time, the control voltage delivered to pin 13 is high due to inversion of the output of inverting amplifier 30 by inverting amplifier 32. As a result, switch S2 is on while switch S1 is off during the 80 μS (read/sampling) pulse. This causes the voltage output at 14 to be coupled to capacitor 22 where it is stored and coupled through operational amplifier 23 to provide an analog voltage signal output at terminal 24 representing the temperature of the environment in which the sensor 12 is located.

During alternate periods of low level control voltage (absence of the 80 μS pulse), the inverting amplifier 30 produces a high level control voltage which is coupled to pin 5 of switch S1 to turn switch S1 on. At the same time, the output of inverting amplifier 30 is again inverted by amplifier 32 to produce a low level control voltage at pin 13 of switch S2. As a result, switch S2 is off while switch S1 is on during the alternate clock periods. This configuration breaks the coupling of the voltage at terminal 14 to capacitor 22 and at the same time shorts the voltage at terminal 14 to ground.

As will be appreciated, during the pulse periods, when the switch S2 is on and the switch S1 is off, the voltage at terminal 14 is coupled to the sensor 12 and causes heat dissipation within the sensor 12 in the manner previously described. In contrast, during alternate non-pulse periods, when switch S1 is on and switch S2 is off, the terminal 14 is shorted to ground thereby preventing any heat dissipation within the sensor 12. By switching the output of the sensor 12 in this manner, the voltage on the sensor 12 applied through terminal 14 is altered to prevent a constant heat dissipation as would normally occur in configurations of the prior art.

It has been determined experimentally, that the above alternate switching produces a voltage on capacitor 22 during the pulse period which is a function of the absolute temperature of the environment in which the sensor 12 is located. This sampled temperature analog voltage is retained on the capacitor C1 while the temperature sensor 12 is shorted out. However, by shorting the temperature sensor during those alternate periods, the temperature sensor 12 will reach a steady-state output within certain tolerances in a much shorter time period than by the continuous operation techniques of the prior art.

By way of example, it has been determined that the system 10 will reach a steady-state output to within 0.1° C. in less than 10 seconds. In experimental measurements, it has been found that the transient error is actually reduced to within that 0.1° C. in less than one second by sampling the capacitor output 22 at one second intervals. The circuit thus provides an operative technique which reduces the long lag times necessary for conventional use of the sensors 12. It has been found, however, that for operation below −40° C., a resistor of approximately 390 ohms must be added in series with the switch S1 to maintain a small voltage on the sensor 12 between sampling pulses in order to provide proper operation. Accordingly, such construction allows implementation and operation of the system over temperature ranges from −55° C. to +75° C. without difficulty.

As can be seen by the above description, the present invention employs conventional structures coupled in the unique manner to provide an operation which improves performance of the temperature sensor. In particular, the output of a temperature sensor is alternately sampled and shorted to store an analog voltage representative of the temperature of the environment in which it is located. By alternately sampling that voltage, the accuracy and linearity of the sensor is maintained over a wide range of temperatures, but the transient error produced by internal heat dissipation in the sensor 12 is reduced so that the sensor can reach a steady-state output within small tolerances in much shorter periods of time. This produces a system which enables fast response, particularly for use in guidance system, using only circuits which may be manufactured by conventional mass production techniques with low cost and easy implementation. These are features which are not shown or suggested in any of the prior art.

Figure 2:
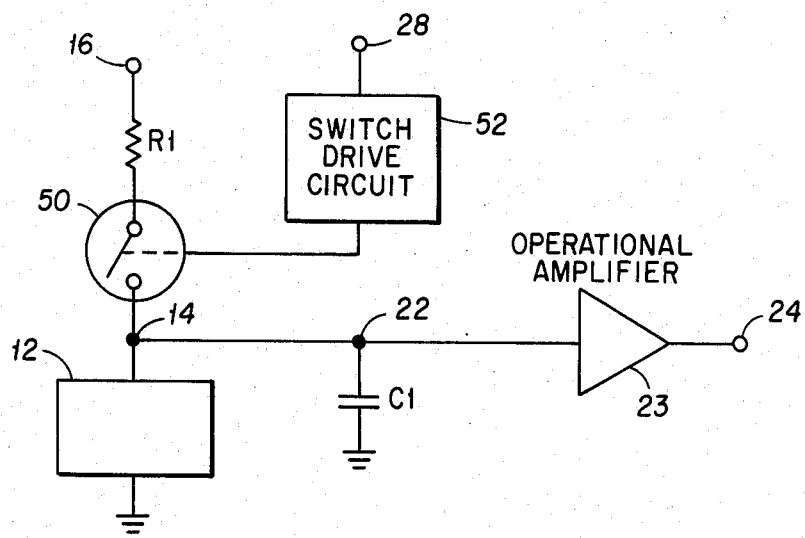
FIG. 2 is an alternative embodiment of the circuit of FIG. 1.

Referring now to FIG. 2, there is shown an alternative embodiment of the present invention. In this instance the elements common to both are shown by the same reference numerals as used in FIG. 1. As can be seen, the dual switch arrangement includes switch S1 coupled to be driven by the driving circuit 52 from the clock source provided at terminal 28 to connect and disconnect the voltage at terminal 16 (through resistor R1) to the terminal 14. In this embodiment, switches S1 and S2 are opened and closed together in contrast to the operation of FIG. 1. In this manner, the switches S1 and S2 sample the voltage at terminal 14 in the closed condition and provide that voltage to capacitor C1 which retains that voltage when switches S1 and S2 are opened. This produces the alternate sampling needed to provide the improved response.

Although the invention has been described with particular reference to the specific devices shown in the Figures, and the use of a specific clock source pulse width and repetition rate, it is apparent that the same may be implemented using equivalent structures. It will also be apparent that the pulse clock source timing may be varied in accordance with the environment in which the sensors are used to produce operation in a similar manner. Accordingly, it is apparent that other obvious variations and modifications of the present invention are possible in light of the above teachings. It is therefore to be understood that within the scope of the appended claims, the invention may be practiced otherwise than as specifically described.

What is claimed is:

1. A method of sensing temperature using a temperature sensor coupled to provide an output voltage related to the sensed temperature, the improvement in said method comprising:
    sampling said output voltage during at least one first time period to provide a signal representing temperature;
    shorting said output voltage across said sensor during at least one second time period so that there is substantially no voltage output from said sensor during said at least one second time period;
    providing said sampled output voltage as a temperature signal; and
    repeating said sampling and shorting steps to intermittently interrupt current flow through said sensor at a rate sufficient to reduce heat dissipation causing temperature increases in said sensor and in turn reduce transient error in said output voltage indicating temperature.

2. The method of claim 1 further comprising the step of performing said sampling and shorting steps alternately a plurality of times.

3. The method of claim 1 wherein said step of sampling comprises intermittently sampling said output voltage through a switch to provide said output voltage as a temperature signal, and wherein said shorting step comprises intermittently shorting said voltage output through a switch for time periods alternating with said intermittent sampling.

4. The method of claim 3 wherein said intermittent sampling and shorting steps comprise controlling said switches with a clock source driven by a pulse of predetermined width at a selected repetition frequency.

5. The system of claim 4 wherein said pulse width is 80 $\mu$S and said repetition frequency is 780 Hz.

6. The method of claim 1 further comprising the step of storing said sampled voltage to provide said signal representing temperature.

7. In a temperature sensing system having a temperature sensor coupled to provide a voltage output representing temperature, the improvement in said system comprising:
   means for sampling said voltage output during at least one first time period to provide a signal representing temperature;
   means for shorting said voltage output across said sensor during at least one second time period so that there is substantially no voltage output from said sensor during said at least one second time period; and
   means for providing said sampled voltage output as a temperature signal, said means for sampling and said means for shorting being constructed and arranged to repetitively sample and short said voltage output to intermittently interrupt current flow through said sensor at a rate sufficient to reduce heat dissipation causing temperature increases in said sensor and in turn reduce transient error in said output voltage indicating temperature.

8. The system of claim 7 further comprising means for storing said sampled voltage output to form said temperature signal.

9. The system of claim 7 wherein said means for selectively sampling and shorting comprises a switching circuit having a first switch operable between an open and closed position, and a second switch operable between an open an closed position, said first switch being coupled to intermittently short said voltage output and said second switch being coupled to intermittently provide said voltage output as said temperature signal during periods alternating with said intermittent shorting periods.

10. The system of claim 9 further comprising means for alternately closing and opening said switches such that one switch is closed while the other is opened.

11. The system of claim 8 wherein said means for storing comprises a capacitor.

12. In a temperature sensing system having a temperature sensor coupled to provide a voltage output representing temperature, the improvement in said system comprising:
   means for selectively sampling and shorting said voltage output and including a switch circuit having a first switch operable between an open and closed position, and a second switch operable between an open and closed position, said first switch being coupled to intermittently short said voltage output and said second switch being coupled to intermittently provide said voltage output as a sampled voltage output during periods alternating with said intermittent shorting periods;
   means for alternately closing and opening said switches such that one switch is closed while the other switch is open and including a clock source providing pulses of predetermined width at a predetermined repetition frequency, a first inverting amplifier couled to receive said clock source pulses and provide an inverted output coupled to open and close said first switch, and a second inverting amplifier coupled to receive the inverted output of said first inverting amplifier and provide an inverted output coupled to open and close said second switch; and
   means for providing said sampled voltage output as a temperature signal.

13. The system of claim 12 wherein said clock source is constructed to provide pulses of 80 $\mu$S pulse width at a repetition frequency of 780 Hz.

14. A method of sensing temperature using a temperature sensor coupled to provide an output voltage indicating the sensed temperature, the improvement in said method comprising:
   intermittently coupling a voltage source to drive one sensor to intermittently provide said output voltage indicating said sensed temperature;
   sampling said output voltage of said one sensor only during said intermittently coupling to provide a signal indicating temperature sensed by said one sensor; and
   repeating said intermittent coupling and sampling to intermittently interrupt current flow through said sensor at a rate sufficient to reduce heat dissipation causing temperature increases in said sensor and in turn reduce transient error in said output voltage indicating temperature.

15. In a temperature sensing system having a temperature sensor coupled to provide an output voltage indicating the sensed temperature, the improvement in said system comprising:
   means for intermittently coupling a voltage source to drive one sensor to intermittently produce said output voltage indicating said sensed temperature; and
   means for sampling said output voltage of said one sensor only during said intermittent coupling to provide a signal indicating temperature sensed by said one sensor, said means for intermittently coupling and said means for sampling being constructed and arranged to repeatedly couple and sample to intermittently interrupt current flow through said sensor at a rate sufficient to reduce heat dissipation causing temperature increases in said sensor and in turn reduce transient error in said output voltage indicating temperature.

* * * * *